(12) United States Patent
Cariffe

(10) Patent No.: US 6,996,290 B2
(45) Date of Patent: Feb. 7, 2006

(54) BINDING CURVATURE CORRECTION

(75) Inventor: Alan Eddy Cariffe, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 562 days.

(21) Appl. No.: 10/062,046

(22) Filed: Jan. 31, 2002

(65) Prior Publication Data

US 2003/0142884 A1    Jul. 31, 2003

(51) Int. Cl.
*G06K 9/40* (2006.01)

(52) U.S. Cl. ....................... 382/275; 382/274
(58) Field of Classification Search ............... 382/274, 382/285, 287, 289, 290, 296, 275
See application file for complete search history.

(56) References Cited

U.S. PATENT DOCUMENTS

| | | | | |
|---|---|---|---|---|
| 5,012,275 A | | 4/1991 | Bock | 355/25 |
| 5,057,876 A | | 10/1991 | Ohno | 355/328 |
| 5,177,617 A | | 1/1993 | Tuhro | 358/296 |
| 5,479,262 A | * | 12/1995 | Namiki et al. | 358/296 |
| 5,526,098 A | | 6/1996 | Peck et al. | 355/230 |
| 5,583,607 A | | 12/1996 | Fujioka et al. | 355/25 |
| 5,659,838 A | * | 8/1997 | Ando et al. | 399/45 |
| 5,781,313 A | | 7/1998 | Nose et al. | 358/497 |
| 5,848,197 A | * | 12/1998 | Ebihara | 382/275 |
| 5,940,544 A | * | 8/1999 | Nako | 382/293 |
| 5,969,795 A | | 10/1999 | Honda et al. | |
| 5,973,769 A | | 10/1999 | Reiko | 355/82 |
| 6,097,916 A | * | 8/2000 | Asai | 399/182 |

OTHER PUBLICATIONS

U.S. Patent Application entitled "Method and Apparatus for Three-Dimensional Shadow Lightening", U.S. Appl. No. 09/956,500 filed on Sep. 19, 2001.
Wada et al. "Shape from Shading with Interreflections Under a Proximal Light Source", International Journal of Computer Vision, vol. 24, No. 2, Sep. 1997 pp. 125-135.
Krell et al. "An Artificial Neural Network for Real-time Image Restoration" IEEE vol. 2, 4, Jun. 1996 pp. 833-838.
Nakajima et al. "Compensation of Partly Photographed Page-Images Using 3D Shape Information" IEEE vol. 2, Jun. 7, 1999 pp. 179-183.
Brown et al. "Document Restoration Using 3D Shape" IEEE, vol. 2, 7, Jul. 2001 pp. 367-374.
Iwahori et al. "Classification of Surface Curvature from Shading Images Using Neural Network" IEICE vol. E81-D, No. 8 Aug. 1998 pp. 889-900.
EP search report dated Feb. 17, 2005.

* cited by examiner

*Primary Examiner*—Bhavesh M. Mehta
*Assistant Examiner*—Sath V. Perungavoor

(57) ABSTRACT

Various systems, methods, and programs embodied on a computer readable medium are provided for binding curvature correction in an image of pages of a bound medium. The binding curvature correction involves electronically acquiring an image of a set of pages of a bound medium, the image of the set of pages having a binding curvature distortion, and, generating a corrected image, the corrected image including the content of the image without the binding curvature distortion.

33 Claims, 8 Drawing Sheets

BINDING CURVATURE CORRECTION

CROSS REFERENCE TO RELATED CASES

This patent application is related to U.S. patent application entitled "Method and Apparatus for Three-Dimensional Shadow Lightening", assigned Ser. No. 09/956,500, filed on Sep. 19, 2001.

BACKGROUND OF THE INVENTION

Often times an individual will copy or scan pages of a bound medium to obtain a copy or generate an image of the exposed pages. Unfortunately, bindings on bound media can make this task difficult. Specifically, the binding of a bound medium often does not allow the full pages to be placed flat against the scan surface. As a result, a part of the page can be distorted and any text contained therein may be difficult to read.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
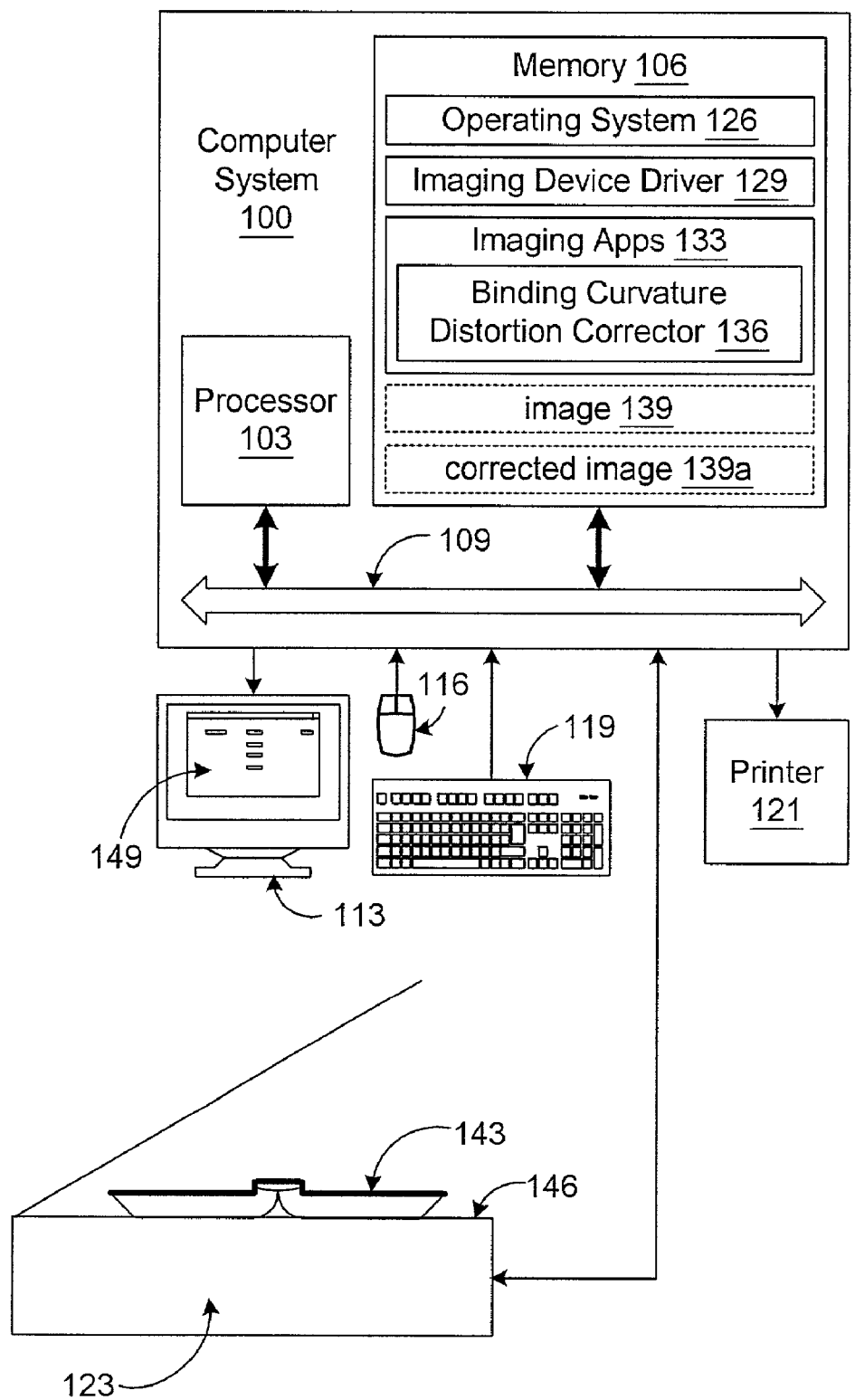
FIG. 1 is a block diagram of a computer system with a binding curvature distortion corrector according to an embodiment of the present invention.

With reference to FIG. 1, shown is a computer system 100 that is employed to correct binding curvature distortions in images as will be described. In this respect, the computer system 100 includes a processor circuit with a processor 103 and a memory 106, all of which may be coupled to a local interface 109. The local interface 109 may be, for example, a data bus with a control/address bus as can be appreciated by those with ordinary skill in the art. Coupled to the computer system 100 is a display device 113, a mouse 116, a key board 119, a printer 121, and an imaging device 123. The imaging device 123 may be, for example, a scanner, digital imaging device using a photo array, or other imaging device. In addition to these peripherals, other peripheral devices may be coupled to the computer system 100 such as, for example, a keypad, touch pad, touch screen, microphone, joystick, or one or more push buttons, etc. The peripheral devices may also include indicator lights, speakers, etc. The display device 113 may be, for example, a cathode ray tube (CRT), liquid crystal display screen, gas plasma-based flat panel display, or other types of display device, etc.

While the processor circuit comprising the processor 103, the memory 106, and the local interface 109 are shown as a component of the computer system 100, it can be appreciated that the processor circuit can be located in any one of a multitude of different systems or devices as can be appreciated by those with ordinary skill in the art.

The computer system 100 also includes several components that are stored in the memory 106 and are executable by processor 103. These components include an operating system 126, a imaging device driver 129, and one or more imaging applications 133. The various imaging applications 133 include a binding curvature distortion corrector 136 according to an embodiment of the present invention. The imaging applications 133 may also include other applications that provide a user with a degree of control over the operation of the imaging device 123 or other peripherals attached to the computer system 100. For example, such other applications may include optical character recognition algorithms, etc. In addition, one or more images 139 are stored on the memory 106. The images 139 may be generated, for example, by the imaging device 123. The image 139 is processed by the binding curvature distortion corrector 136 to generate a corrected image 139a as will be described. The corrected image 139a includes the content of the image 139 without the binding curvature distortion.

The image 139 is of a set of pages of a bound medium 143, for example, that may be placed on a imaging acquisition surface 146 of the imaging device 123. An image is acquired of the pages that lie flat against the imaging acquisition surface 146 of the imaging device 123 or that lie within a focal plane of the imaging device 123. This may be done by scanning or generating a digital image of the pages, etc. In the case that a digital photo is taken of the pages, then the pages may be opened and positioned relative to a lens that focuses the image onto a sensor array, etc. Thus, the imaging device 123 may be a scanner, digital camera, or other imaging device. The bound medium 143, may be, for example, a hard cover book, a paperback book, a notebook, or other medium that is bound using any of a number of techniques that ultimately results in a binding curvature distortion in the image 139 created by the imaging device 123. In addition, a user interface 149 may generated on the display device 113 by executing an appropriate one of the imaging applications 133. The user interface 149 may also be embodied in some other form beyond the display on the display device 113 such as a touch screen, push buttons, keyboard, etc., where the user interface 149 is merely representative of such alternatives that may be employed. The user interface 149 provides input and output components that may be manipulated by a user using the mouse 116 or the keyboard 119 or other input device to control the functions of the imaging device 123, printer 121, or other devices coupled to the computer system 100.

Next a general overview of the operation of the computer system 100 is described in which a binding curvature distortion is eliminated in an image 139 that was created by acquiring an image of a set of pages of a bound medium 143 with the imaging device 123. Specifically, a user positions the bound medium 143 onto the imaging acquisition surface 146 or within the focal plane of the imaging device 123. The user may then manipulate various input components either on the imaging device 123 itself or in the user interface 149 to cause the imaging device 123 to acquire the image of the current set of pages that lie face down on the image acquisition surface 146. Thereafter, the imaging device 123 generates the image 139 of the set of pages from the bound medium 143 and supplies the image 139 to the computer system 100 where it is stored, for example, in the memory 106. Alternatively, the image 139 may already be stored or maintained in the memory 106 as a file that was generated using some other imaging device 123 and downloaded to the memory 106.

The user interface 149 provides the user with the opportunity to activate the binding curvature distortion corrector 136 in order to correct a binding curvature distortion on the image 139 assuming that an image of pages from a bound medium 143 is to be created. Assuming that the binding curvature distortion corrector 136 is so activated, then the binding curvature distortion corrector 136 processes the image 139 to correct a binding curvature distortion thereon and generates the corrected image 139a. The corrected image 139a includes the content of the image 139 without the binding curvature distortion. Thereafter, the corrected image 139a may be rendered on an appropriate rendering device such as a display device or printer, stored in a memory, or otherwise processed as desired by the user.

Figure 2:
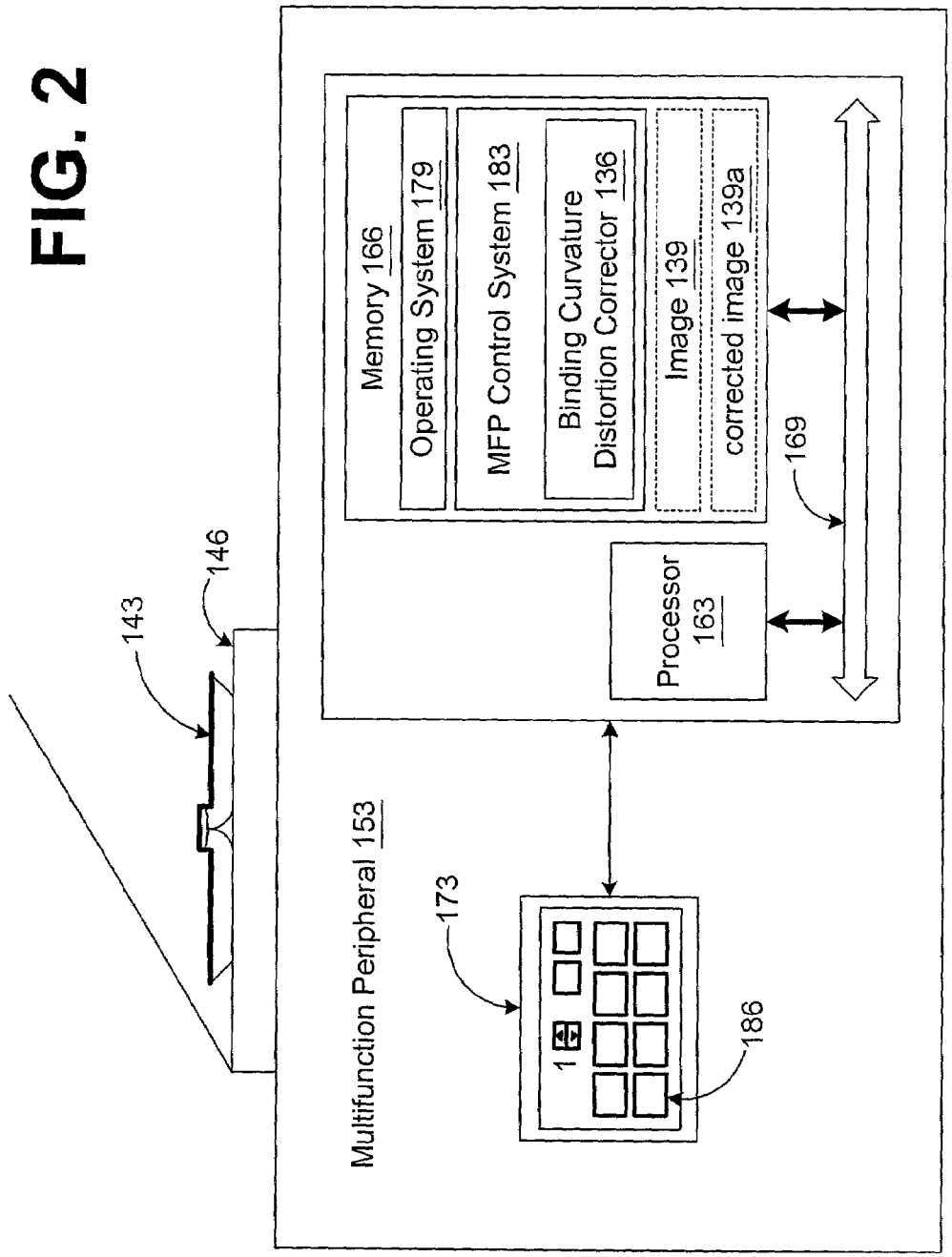
FIG. 2 is a block diagram of a multifunction peripheral that employs the binding curvature distortion corrector of FIG. 1 according to another embodiment of the present invention.

With reference to FIG. 2, shown is a multifunction peripheral 153 according to another embodiment of the present invention. In this respect, the multifunction peripheral 153 may provide copying, scanning, printing, digital sending, and facsimile functions as well as other functions. In this respect, the multifunction peripheral 153 includes a processor circuit having a processor 163 and a memory 166, all of which may be coupled to a local interface 169. The local interface 169 may be, for example, a data bus with an accompanying control/address bus as can be appreciated by those with ordinary skill in the art.

The multifunction peripheral 153 also includes a user interface that may be, for example, a touch screen, a number of push buttons/display devices, or other user interfaces. Similar to the imaging device 123 (FIG. 1), the multifunction peripheral 153 also includes the imaging acquisition surface 146 upon which the bound medium 143 may be placed in order to scan the set of pages that are in contact with the imaging acquisition surface 146.

The multifunction peripheral 153 also includes various components that are stored in the memory 166 and are executable by the processor 163. Such components may include, for example, an operating system 179 and a multifunction peripheral (MFP) control system 183. The MFP control system 183 is executed in the processor circuit in order to control a general functionality of the multifunction peripheral 153 including the control of mechanical and/or electrical components therein.

The MFP control system 183 includes the binding curvature distortion corrector 136 according to an embodiment of the present invention. The binding curvature distortion corrector 136 may be activated by manipulating an appropriate input component 186 of the user interface 173 or by manipulating some other appropriate interface. The interface may be generated, for example, on the display device 149 or may be viewed on a display device associated with a different computer system that is linked to the computer system 100 through a network. In addition, the image 139 is stored in the memory 166 having been generated from the set of pages of the bound medium 143 that are in contact with the image acquisition surface 146 assuming that an image acquisition operation was implemented.

Assuming that the binding curvature distortion corrector 136 has been enabled by manipulating the appropriate input component 186 of the user interface 173, then the binding curvature distortion corrector 136 processes the acquired image 139 to eliminate any binding curvature distortion that may exist in the image 139. Alternatively, the binding curvature distortion corrector 136 may automatically sense that an acquired image 139 includes a binding curvature distortion that is to be corrected. In such case, the user would not have to enable the binding curvature distortion corrector 136. The binding curvature distortion corrector 136 may process any number of images 139 of sets of pages of the bound medium 143. In correcting each of the images 139, the binding curvature distortion corrector 136 generates a corresponding corrected image 139a. Ultimately, the binding curvature distortion corrector 136 may create a multipage document within a single file.

With respect to FIGS. 1 and 2, the memories 106 and 166 are defined herein as both volatile and nonvolatile memory and data storage components. Volatile components are those that do not retain data values upon loss of power. Nonvolatile components are those that retain data upon a loss of power. Thus, the memories 106 and 166 may comprise, for example, random access memory (RAM), read-only memory (ROM), firmware, hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 103 and 163 may represent multiple processors and each of the memories 106 and 166 may represent multiple memories that operate in parallel processing circuits, respectively. In such a case, each of the local interfaces 109 and 169 may be an appropriate network that facilitates communication between any two of the multiple processors, between any processor and any of the memories, between any two of the memories, or between external processors, etc. The processors 103 and 163 may be electrical, optical, or molecular in nature. Also, the processors 103 and 163 may be digital or analog processors.

In addition, the operating systems 126 and 179 are executed to control the allocation and usage of hardware resources in the computer system 100 and the multifunction peripheral 153 such as the memory, processing time and peripheral devices. In this manner, the operating systems 126 and 179 serve as the foundation on which applications depend as is generally known by those with ordinary skill in the art.

Figure 3:
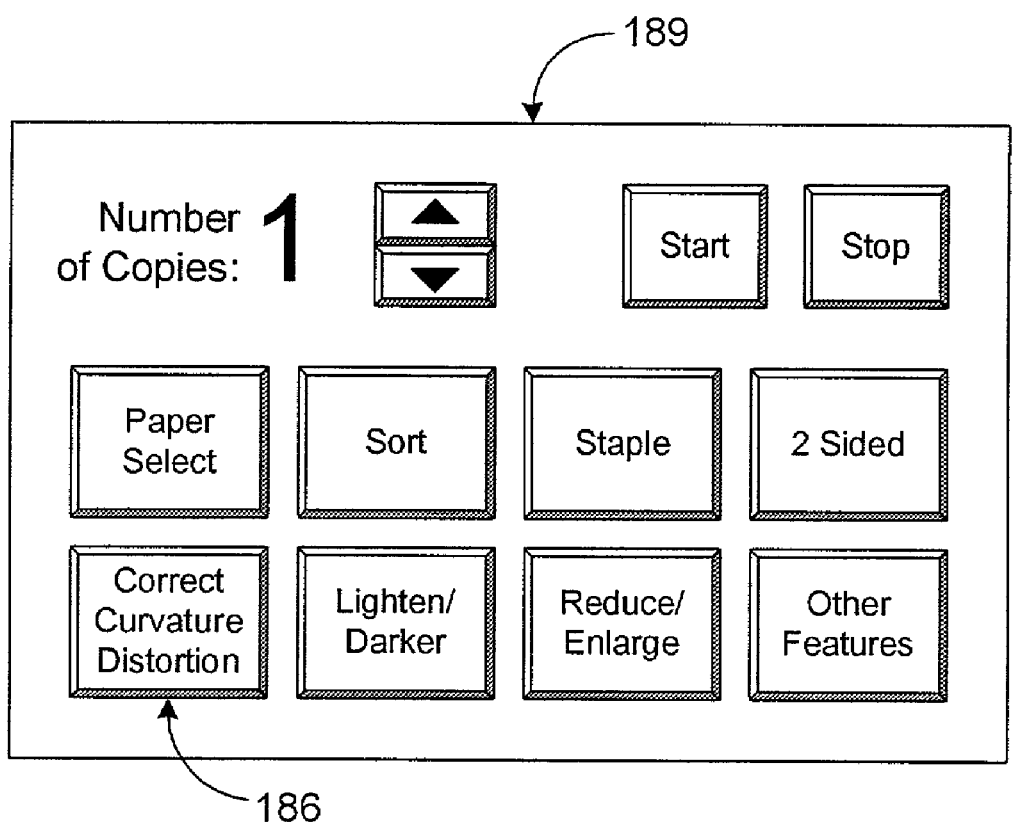
FIG. 3 is a drawing of a user interface employed in the multifunction peripheral of FIG. 2.

With respect to FIG. 3, shown is an exemplary screen 189 displayed, for example, on a touch screen that includes the input component 186 that may be manipulated by a user to enable or disable the binding curvature distortion corrector 136. Alternatively, other types of user interface devices may be employed beyond a touch screen that includes components similar to those depicted in the screen 189, the screen 189 being illustrated herein to provide an example of the various features that may be controlled on the multifunction peripheral. In addition, the screen 189 may include other components that provide for other functionality of the multifunction peripheral 153.

Figure 4:
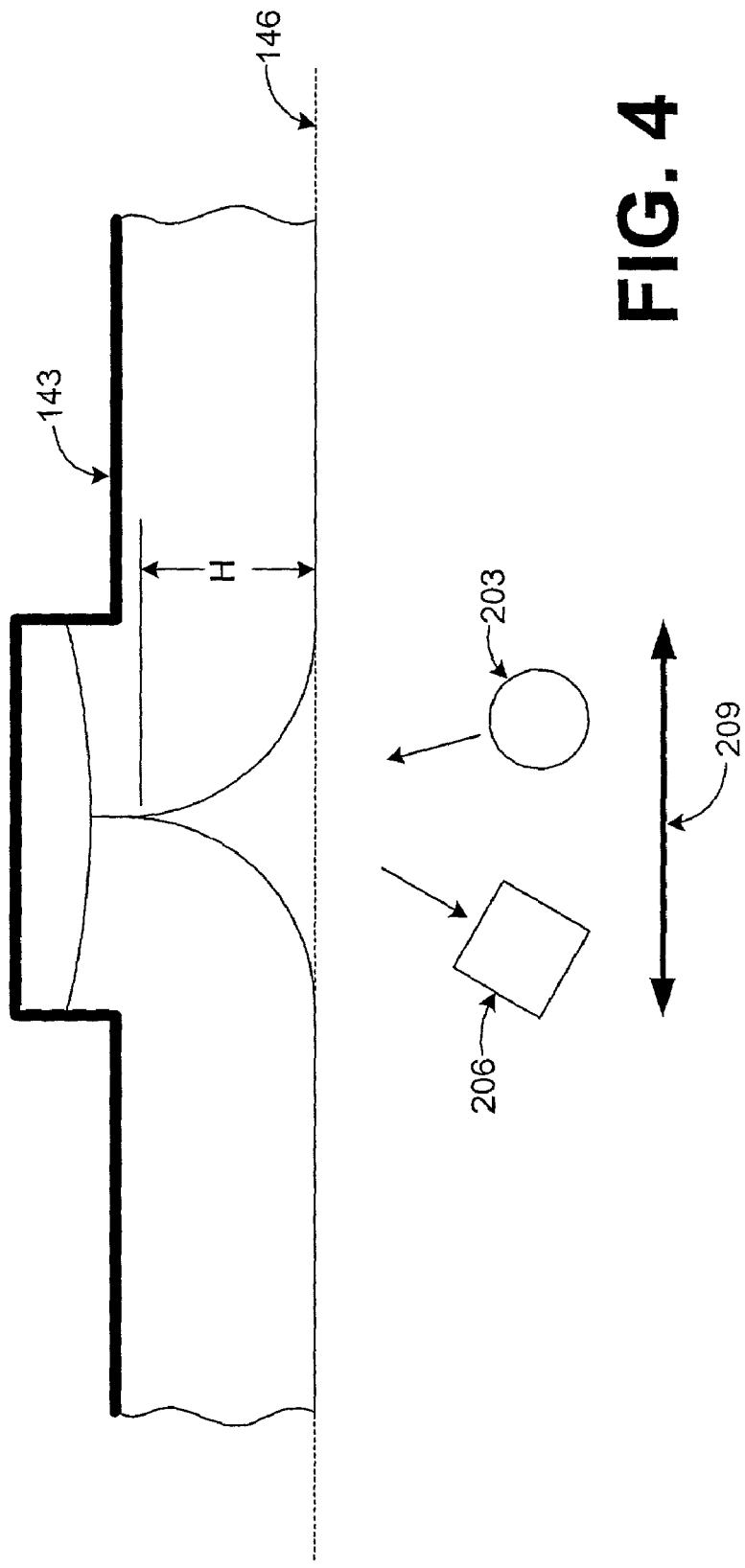
FIG. 4 is a drawing of a portion of a bound medium disposed on an image acquisition surface of the computer system of FIG. 1 or the multifunction peripheral of FIG. 2.

With respect to FIG. 4, shown is a depiction of an image acquisition operation performed on the bound medium 143 using, for example, a scan operation. The scan operation may be performed in both the imaging device 123 (FIG. 1) and the multifunction peripheral 153 (FIG. 2). In the exemplary scan operation, a light source 203 is provided that illuminates any medium placed on the imaging acquisition surface 146. A sensor 206 is also provided to receive the reflected light from the medium. Both the light source 203 and the sensor 206 are moved along a scan axis 209 relative to the imaging acquisition surface 146 and any bound medium 143 placed thereon. Alternatively, the bound medium 143 may be moved relative to the light source 203 and the sensor 206 as can be appreciated by those with ordinary skill in the art. Also, the bound medium 143 may be placed in a different orientation relative to the scan axis 209. Such an orientation may be, for example, rotated 90 degrees relative to the position shown in FIG. 4.

Due to the binding of the bound medium 143, a portion of the two pages is not in contact with the imaging acquisition surface 146. As shown, this portion reaches above the imaging acquisition surface 146 by a height H. The height H may vary along the bound medium 143. The height H is related to the severity of the resulting binding curvature distortion in the image 139. The height H may be determined based upon the image 139 so as to correct the binding curvature distortion.

The image 139 (FIG. 1, FIG. 2) that is created of the bound medium 143 may vary depending upon the geometry of the components in the imaging device 123. For example, the location of the light source 203 and the sensor 206 relative to the bound medium 143 may affect the nature, quality, and/or appearance of any binding curvature distortion that appears in the resulting image 139.

Figure 5:
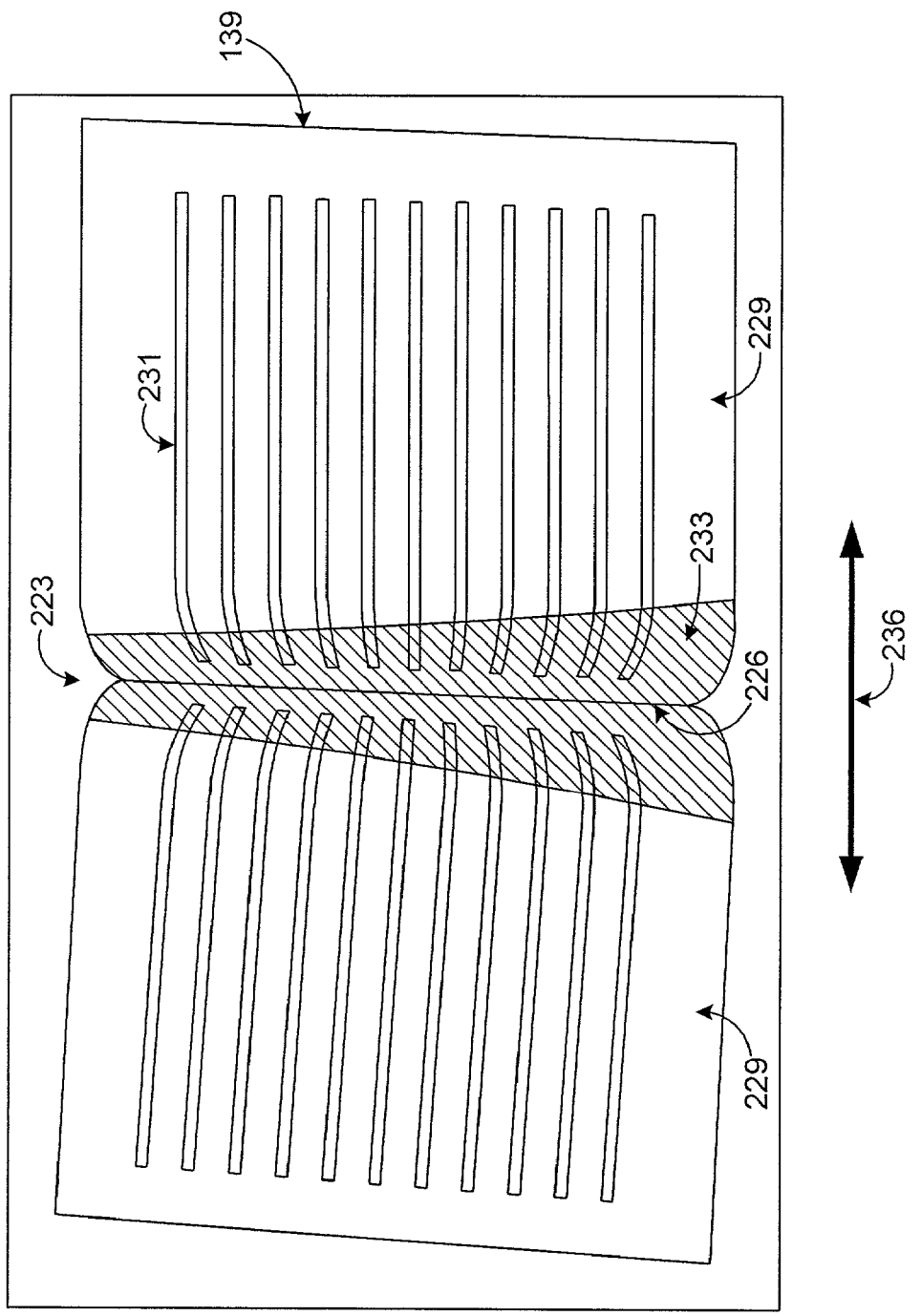
FIG. 5 is a drawing of an image of a set of pages generated by the imaging device employed with the computer system of FIG. 1 or within the multifunction peripheral of FIG. 2.

Turning then to FIG. 5, shown is an example of the image 139 with a binding curvature distortion 223. The binding curvature distortion 223 includes a binding centerline 226 that marks the middle of the set of pages 229 depicted in the image 139. A number of lines of text 231 may be located on the pages 229. Also, images may be located on the pages 229, etc. The lines of text 231 may include a portion that falls within the binding curvature distortion 223 and a portion that falls outside of the binding curvature distortion 223. The portions of the lines of text 231 that fall outside of the binding curvature distortion 223 were generally positioned on the imaging acquisition surface 146 when the image 139 was created by an appropriate scan operation. When scanned, a brightness gradient 233 is often created in the binding curvature distortion 223. The brightness gradient 233 is related to the distance of the pages 229 from the imaging acquisition surface 146 during the image acquisition function in the middle of the bound medium 143. Generally, the brightness is darkest near the binding centerline 226 and lightens as it nears the portion of the bound medium 143 that rests against the imaging acquisition surface 146. An axis 236 is shown relative to the image 139 that may be parallel with one side of the image, etc. The binding centerline 226 may or may not be perpendicular to the axis 236, depending upon the orientation of the bound medium 143 when placed upon the imaging acquisition surface 146 when the image 139 is acquired.

Figure 6:
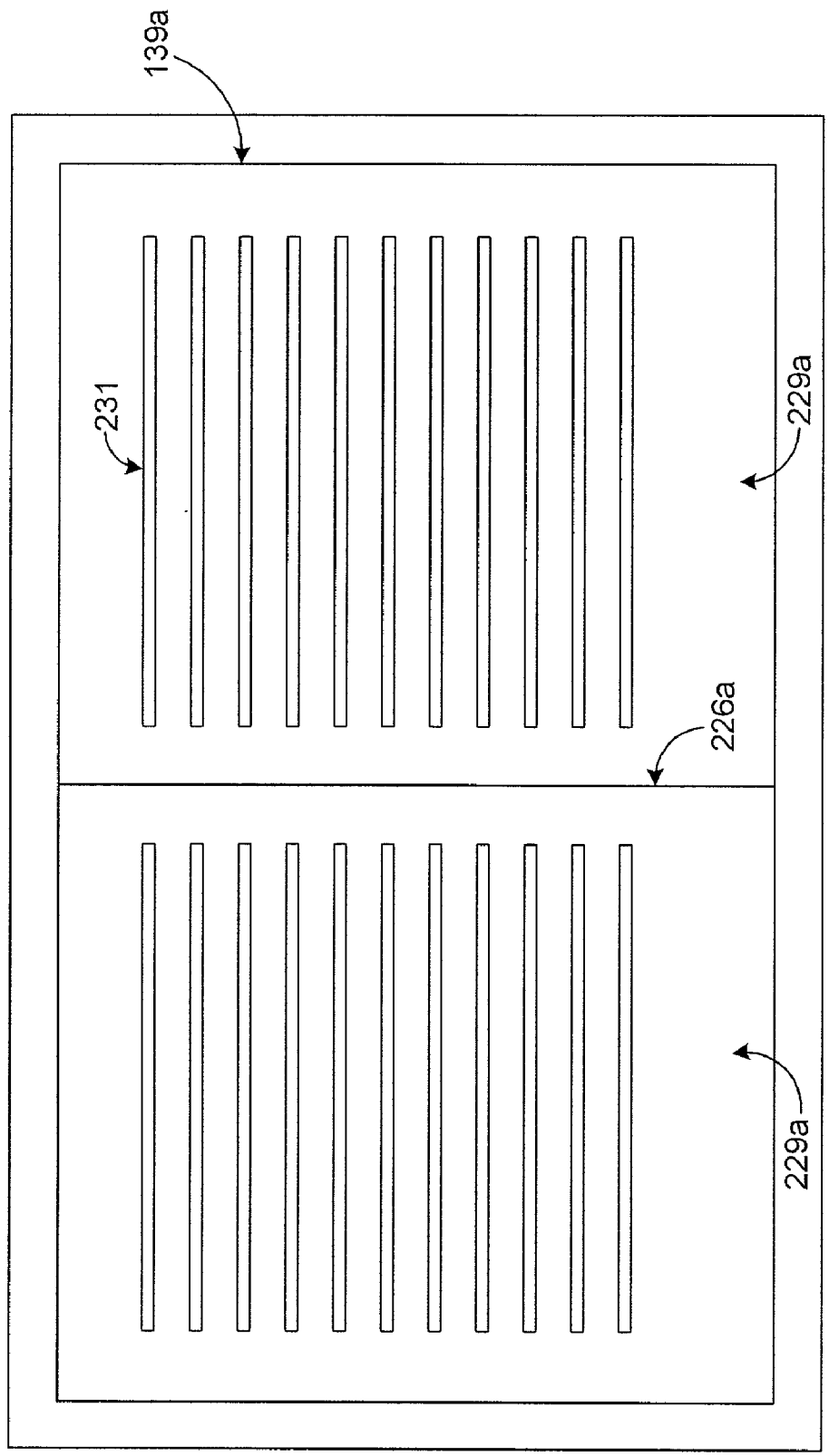
FIG. 6 is a drawing of a corrected image that includes the content of the image of FIG. 5 without the binding curvature distortion.

Referring next to FIG. 6, shown is a corrected image 139a that includes all of the content of the image 139 (FIG. 5) without the binding curvature distortion 223. In the image 139a, the binding curvature distortion 223 (FIG. 5) has been eliminated and the lines of text 231 all appear to have been acquired from a position resting against the imaging acquisition surface 146. Consequently, the image 139a looks flat. In addition, the lines of text 231 are oriented so as to be parallel to each other. A centerline 226a may be included between the pages to indicate the separation between the pages, although the centerline 226a may or may not be as heavy as the centerline 226 (FIG. 5). The brightness gradient 233 has been eliminated. Also, the pages 229a are elongated as compared to the pages 229 (FIG. 5), thereby accommodating the content from the brightness curvature distortion 223.

Figure 7:
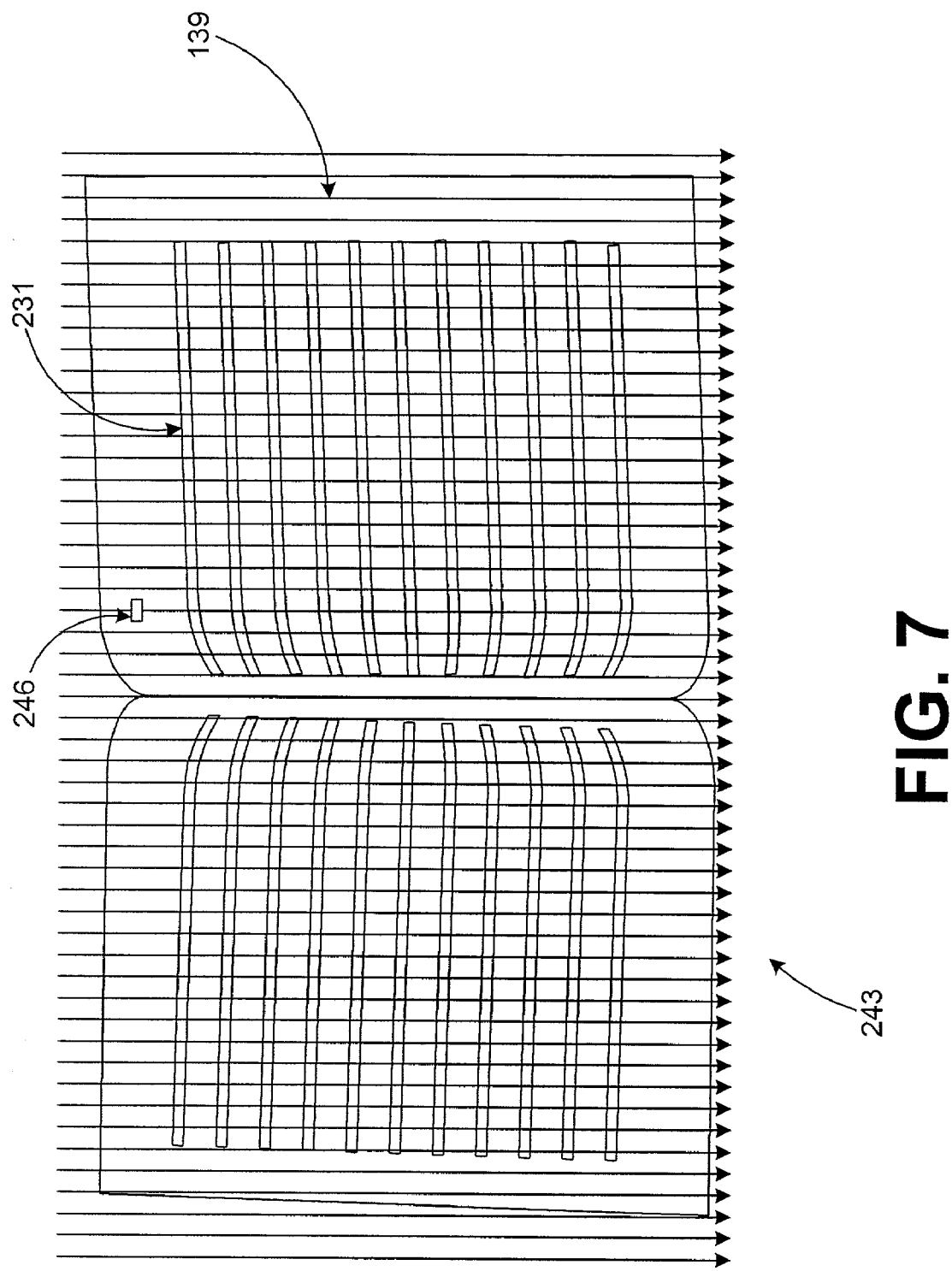
FIG. 7 is a drawing of an exemplary brightness scan that may be performed by the binding curvature distortion corrector of FIG. 1 to locate lines of text in the image of FIG. 5.

With reference to FIG. 7, shown is a brightness scan 243 that is performed, for example, so that the binding centerline 226 and other features of the image 139 may be identified or measured. During the brightness scan 243, a measure of the brightness of the image 139 across its entire face is obtained by measuring the brightness of a number of scan areas 246 in a scanning pattern. The scan areas 246 may be any size depending upon the scan resolution of the brightness scan 243. Once the brightness is ascertained across the entire face of the image 139, the lines of text 231 may be located by identifying a locus of darkness that is associated with each line of text 231 in the resulting brightness information. In addition, the information obtained from the brightness scan 243 may also reveal the position of the binding centerline 226. Alternatively, the brightness information may be obtained via some other approach, etc.

Figure 8:
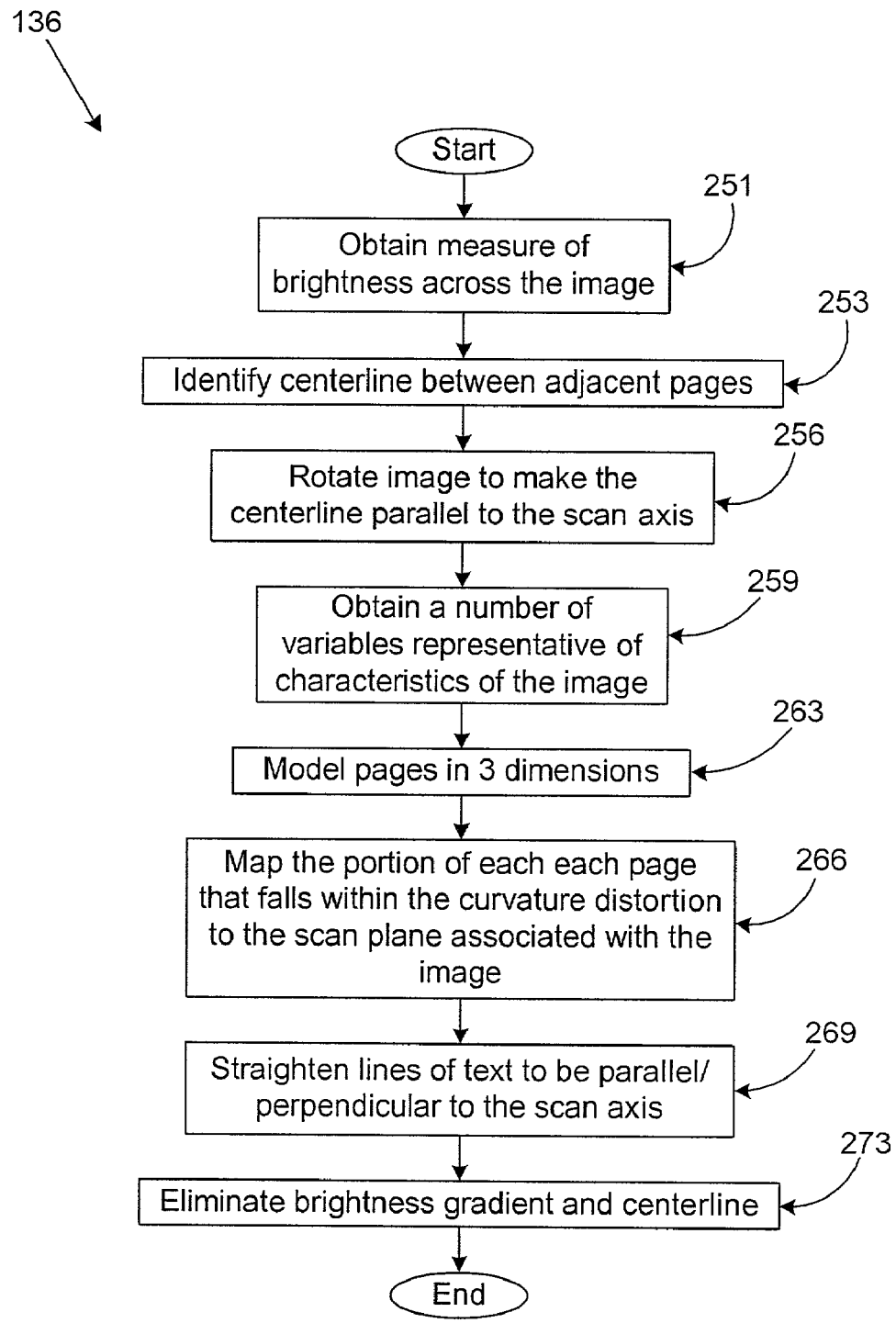
FIG. 8 is a flow chart of one embodiment of the binding curvature distortion corrector of FIG. 1.

Turning then to FIG. 8, shown is a flow chart of the binding curvature distortion corrector 136 implemented, for example, in the computer system 100 (FIG. 1), the multifunction peripheral 153 (FIG. 2), or other device. Alternatively, the flow chart of FIG. 8 may viewed as depicting steps of a method for correcting a binding curvature distortion that is implemented in the computer system 100, multifunction peripheral 153 or other appropriate device.

To start, in box 251 a measure of the brightness across the image 139 (FIG. 5) is obtained by performing the brightness scan 243 (FIG. 7) of the image 139. Then, in box 253, the binding curvature distortion corrector 136 first identifies the binding centerline 226 (FIG. 5) between the adjacent pages 229 (FIG. 5). The binding centerline 226 may be identified as a line of darkness through the brightness gradient 233 (FIG. 5) and may be detected by examining the brightness gradient 233 to locate the binding centerline 226 therein. Such may be determined, for example, from the brightness information obtained from the brightness scan 243.

Thereafter, the binding curvature distortion corrector 136 proceeds to box 256 in which the image 139 is rotated so as to position the binding centerline 226 in a perpendicular or parallel orientation relative to a side of the image frame that is associated with the image 139. While a perpendicular orientation is shown with respect to FIG. 5, it is understood that a parallel orientation may exist where the bound medium 143 (FIG. 1) is positioned on the imaging acquisition surface 146 (FIGS. 1 and 2) so that the binding centerline 226 is roughly parallel to the image frame. Alternatively, the image 139 may not be rotated in box 256 in cases where the binding curvature distortion corrector 136 does not need such rotation for the actions that follow. In such case, the binding curvature distortion corrector 136 proceeds directly to box 259 from box 253.

Next in box 259, a number of variables are obtained that are representative of one or more characteristics of the image 139. The variables may include a number of measurements of the brightness gradient 233 in the binding curvature distortion 223 (FIG. 5). In this regard, the brightness gradient 233 may be measured at predetermined points along the binding centerline 226. The variables may be, for example, coefficients of an equation that expresses the brightness gradient along an axis perpendicular to the binding centerline 226. Alternatively, other approaches may be employed to generate variables that represent the nature of the brightness gradient 233.

For a further discussion of the nature of the brightness gradient 233, reference is made to co-pending U.S. patent application entitled "Method and Apparatus for Three-Dimensional Shadow Lightening", Ser. No. 09/956,500, filed on Sep. 19, 2001, and assigned to the assignee of the present application, the entire content of which is incorporated herein by reference.

Also, another characteristic that may be represented by one or more variables is the curvature of any lines of text 231 (FIG. 5) that appear in the pages 229 (FIG. 5) of the image 139. The actual shape or curvature of lines of text 231 may be obtained using techniques employed, for example, with optical character recognition algorithms, etc. Alternatively, the lines of text 231 may be located by examining any loci of darkness that appear in the information obtained from the brightness scan 243 (FIG. 7). Ultimately, the two dimensional contour of each of the lines of text 231 may be expressed by an equation with coefficients that may be used as the variables representing the lines of text 231.

Another characteristic of the image 139 that may be represented by one or more variables is an orientation of each of the pages 229 relative to the image frame or other point or line of reference. Specifically, the orientation of each page 229 effects the nature of the brightness gradient 233. Thus, variables that describe the orientation of the pages 229 may also be generated in box 259. Such values may be related to an angle of each page 229 relative to the binding centerline 226 or the relative to the image 139 itself. Also values may be generated that represent the locations of the three sides of each of the pages 229 that are not inside the brightness gradient 233. To determine the location of the edges of the pages 229, reference is made to the previously referenced U.S. patent application entitled "Method and Apparatus for Three-Dimensional Shadow Lightening", assigned Ser. No. 09/956,500, filed on Sep. 19, 2001.

Still other characteristics of the image 139 may be, for example, the curvature of the edges of the pages 229. Also, the characteristics may include variables that represent the curvature of the surface of the pages 229 as determined, for example, by the curvature of the edges of the pages 229, the brightness gradient 233, and/or any curvature of lines of text 231 on the pages 229. The characteristics may also include variables that represent or are related to distortions created due to any asymmetry of the pages 229 relative to each other, (i.e. where one page is shorter than the other and/or the pages are skewed relative to each other by some angle).

In addition, one or more variables may be generated to represent other characteristics of the image 139 in box 259. Thereafter, the binding curvature distortion corrector 136 proceeds to box 263 in which a three dimensional model of the pages 229 is generated. The three dimensional model may be determined by applying the variables obtained in box 259 to one or more neural networks trained to calculate values that may be employed in generating the three dimensional model. Several neural networks may be cascaded together to generate the ultimate values employed to model the pages 229 in three dimensions. The values generated may be, for example, coefficients in an equation that represents the surface area of the pages 229 in three dimensions.

For example, multiple neural networks may be employed to generate the three-dimensional model by first determining the height H of the binding centerline 226 above the image acquisition surface 146 (FIG. 4) at predetermined positions such as the endpoints of the binding centerline 226. In such case, for example, the curvature of the lines of text 231 and measurements of the brightness gradient 233 may be applied as inputs to a neural network that outputs the height H (FIG. 4) of the binding centerline 226 at predefined locations along the binding centerline 226. The height H may then be applied, for example, along with other variables to the inputs of another neural network that may generate values that are employed in modeling the pages 229 in three dimensions, etc.

The neural networks that may be employed in obtaining the three dimensional model are generally designed as an interconnected system of processing elements, each with a limited number of inputs and an output. These processing elements are trained by receiving weighted inputs that, with adjustment, time, and repetition can be made to produce appropriate outputs. Generally, the training and operation of neural networks is known by those with ordinary skill in the art and not discussed herein in detail.

Thereafter, in box 266 each page 229, including the portion in the brightness gradient 233, is mapped to the corrected image 139a in a position that would ordinarily fall flat on the imaging acquisition surface 146 or focal plane associated with the image 139 in the absence of the binding of the bound medium 143. The mapping may be performed, for example, on a pixel by pixel basis. This mapping may result in the pages 229a (FIG. 6) that are slightly elongated relative to the pages 229 (FIG. 5) due to the addition of pixels to represent the surface area of the pages in the binding curvature distortion 223.

Then, in box 269, the lines of text 231 may be reoriented in the corrected image 139a so as to be perpendicular with the sides of the pages 229 opposite the binding centerline 226, etc. Thereafter, in box 273, any brightness gradient 233 that remains in the corrected image 139a is eliminated so that the brightness is uniform where no text or images appear. Also, an appropriate binding centerline 226a is added thereto. Thereafter, the binding curvature distortion corrector 136 ends.

Although the binding curvature distortion corrector 136 (FIG. 8) is embodied in software or code executed by general purpose hardware as discussed above, as an alternative it may also be embodied in dedicated hardware or a combination of software/general purpose hardware and dedicated hardware. If embodied in dedicated hardware, the binding curvature distortion corrector 136 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIG. 8 shows the architecture, functionality, and operation of an implementation of the binding curvature distortion corrector 136. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention. Also, the flow chart of FIG. 8 is relatively self-explanatory and is understood by those with ordinary skill in the art to the extent that software and/or hardware can be created by one with ordinary skill in the art to carry out the various logical functions as described herein.

Also, where the binding curvature distortion corrector 136 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the binding curvature distortion corrector 136 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), magnetic bubble memory, or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for binding curvature correction, comprising:
electronically acquiring an image of a set of pages of a bound medium, the image of the set of pages having a binding curvature distortion;
generating a corrected image, the corrected image including the content of the image without the binding curvature distortion; and
wherein the generating of the corrected image further comprises:
determining a three dimensional model of the pages in the image; and
mapping each of the pages to the corrected image using the three dimensional model, wherein the corrected image is expressed in two dimensions; and
wherein the determining of the three dimensional model of the pages in the image further comprises:
obtaining a number of input variables representative of characteristics of the image; and
applying the number of input variables to inputs of at least one neural network to generate a number of coefficients of a surface equation representing the three dimensional model; and
wherein the obtaining of the number of input variables representative of characteristics of the image further comprises obtaining a number of values that are representative of a corresponding number of measurements of a brightness gradient in the binding curvature distortion.

2. The method of claim 1, wherein the obtaining of the number of input variables representative of characteristics of the image further comprises obtaining a number of values representative of a position of each of the pages relative to the image.

3. The method of claim 1, wherein the determining of the three dimensional model of the pages in the image further comprises locating a binding centerline in the binding curvature distortion in the image.

4. The method of claim 3, wherein the determining of the three dimensional model of the pages in the image further comprises determining a height of the binding centerline above an image acquisition surface associated with the image.

5. The method of claim 1, wherein the determining of the three dimensional model of the pages in the image further comprises rotating the image to position the binding centerline in a perpendicular orientation relative to a side axis associated with the image.

6. A method for binding curvature correction, comprising:
electronically acquiring an image of a set of pages of a bound medium, the image of the set of pages having a binding curvature distortion;
generating a corrected image, the corrected image including the content of the image without the binding curvature distortion; and
wherein the generating of the corrected image further comprises:
determining a three dimensional model of the pages in the image; and
mapping each of the pages to the corrected image using the three dimensional model, wherein the corrected image is expressed in two dimensions; and
wherein the determining of the three dimensional model of the pages in the image further comprises:
obtaining a number of input variables representative of characteristics of the image; and applying the number of input variables to inputs of at least one neural network to generate a number of coefficients of a surface equation representing the three dimensional model; and wherein the obtaining of the number of input variables representative of characteristics of the image further comprises obtaining a number of values representative of a position of a corresponding number of lines of text on the pages.

7. The method of claim 6, wherein the obtaining of the number of input variables representative of characteristics of the image further comprises obtaining a number of values representative of a position of each of the pages relative to the image.

8. The method of claim 6, wherein the determining of the three dimensional model of the pages in the image further comprises rotating the image to position the binding centerline in a perpendicular orientation relative to a side axis associated with the image.

9. The method of claim 6, wherein the determining of the three dimensional model of the pages in the image further comprises locating a binding centerline in the binding curvature distortion in the image.

10. The method of claim 9, wherein the determining of the three dimensional model of the pages in the image further comprises determining a height of the binding centerline above an image acquisition surface associated with the image.

11. A program embodied in a computer readable medium for binding curvature correction, comprising:
 code that corrects a binding curvature distortion in an image of a set of pages of a bound medium by generating a corrected image that includes the content of the image without the binding curvature distortion, the code that corrects further comprising:
  code that determines a three dimensional model of the set of pages in the image; and
  code that maps each of the pages to the corrected image using the three dimensional model, wherein the corrected image is expressed in two dimensions; and
 wherein the code that determines the three dimensional model of the set of pages in the image further comprises:
  code that obtains a number of input variables representative of characteristics of the image; and
  at least one neural network trained to calculate a number of coefficients of a surface equation representing the three dimensional model from the number of input variables; and
 wherein the code that obtains the number of input variables representative of characteristics of the image further comprises code that obtains a number of values that are representative of a corresponding number of measurements of a brightness gradient in the binding curvature distortion.

12. The program embodied in the computer readable medium of claim 11, wherein the code that obtains the number of input variables representative of characteristics of the image further comprises code that obtains a number of values representative of a position of each of the pages relative to the image.

13. The program embodied in the computer readable medium of claim 11, wherein the code that determines the three dimensional model of the set of pages in the image further comprises code that locates a binding centerline in the binding curvature distortion in the image.

14. The program embodied in the computer readable medium of claim 13, wherein the code that determines the three dimensional model of the set of pages in the image further comprises code that determines a height of the binding centerline above an image acquisition surface.

15. A program embodied in a computer readable medium for binding curvature correction, comprising:
 code that corrects a binding curvature distortion in an image of a set of pages of a bound medium by generating a corrected image that includes the content of the image without the binding curvature distortion, the code that corrects further comprising:
  code that determines a three dimensional model of the set of pages in the image; and
  code that maps each of the pages to the corrected image using the three dimensional model, wherein the corrected image is expressed in two dimensions; and
 wherein the code that determines the three dimensional model of the set of pages in the image further comprises:
  code that obtains a number of input variables representative of characteristics of the image; and
  at least one neural network trained to calculate a number of coefficients of a surface equation representing the three dimensional model from the number of input variables; and
 wherein the code that obtains the number of input variables representative of characteristics of the image further comprises code that obtains a number of values representative of a position of a corresponding number of lines of text on the pages.

16. The program embodied in a computer readable medium of claim 15, wherein the code that obtains the number of input variables representative of characteristics of the image further comprises code that obtains a number of values representative of a position of each of the pages relative to the image.

17. The program embodied in a computer readable medium of claim 15, wherein the code that determines the three dimensional model of the set of pages in the image further comprises code that locates a binding centerline in the binding curvature distortion in the image.

18. The program embodied in a computer readable medium of claim 17, wherein the code that determines the three dimensional model of the set of pages in the image further comprises code that determines a height of the binding centerline above an image acquisition surface.

19. A system for binding curvature correction comprising:
 a processor circuit having a processor and a memory; and
 a binding curvature distortion corrector stored in the memory and executable by the processor, the binding curvature distortion corrector comprising logic that corrects a binding curvature distortion in an image of a set of pages of a bound medium by generating a corrected image that includes the content of the image without the binding curvature distortion, wherein the logic that corrects further comprises:
  logic that obtains a three dimensional model of the set of pages in the image; and
  logic that maps each of the pages to the corrected image using the three dimensional model wherein the corrected image is expressed in two dimensions;
 wherein the logic that obtains the three dimensional model of the set of pages in the image further comprises:
  logic that obtains a number of input variables representative of characteristics of the image; and at least one neural network trained to calculate a number of coefficients of a surface equation representing the three dimensional model from the number of input variables; and wherein the logic that obtains the number of input variables representative of characteristics of the image further comprises logic that obtains a number of values that are representative of a corresponding number of measurements of a brightness gradient in the binding curvature distortion.

20. The system of claim 19, wherein the logic that obtains the number of input variables representative of characteristics of the image further comprises logic that obtains a number of values representative of a position of each of the pages relative to the image.

21. The system of claim 19, wherein the logic that determines a three dimensional model of the set of pages in the image further comprises logic that locates a binding centerline in the binding curvature distortion in the image.

22. The system of claim 21, wherein the logic that determines a three dimensional model of the set of pages in the image further comprises logic that determines a height of the binding centerline above the image acquisition surface.

23. A system for binding curvature correction, comprising:

a processor circuit having a processor and a memory; and a binding curvature distortion corrector stored in the memory and executable by the processor, the binding curvature distortion corrector comprising logic that corrects a binding curvature distortion in an image of a set of pages of a bound medium by generating a corrected image that includes the content of the image without the binding curvature distortion, wherein the logic that corrects further comprises:

logic that obtains a three dimensional model of the set of pages in the image; and logic that maps each of the pages to the corrected image using the three dimensional model, wherein the corrected image is expressed in two dimensions;

wherein the logic that obtains the three dimensional model of the set of pagers in the image further comprises:

logic that obtains a number of input variables representative of characteristics of the image; and at least one neural network trained to calculate a number of coefficients of a surface equation representing the three dimensional model from the number of input variables; and wherein the logic that obtains the number of input variables representative of characteristics of the image further comprises logic that obtains a number of values representative of a position of a corresponding number of lines of text on the pages.

24. The system of claim 23, wherein the logic that obtains the number of input variables representative of characteristics of the image further comprises logic that obtains a number of values representative of a position of each of the pages relative to the image.

25. The system of claim 23, wherein the logic that determines a three dimensional model of the set of pages in the image further comprises logic that locates a binding centerline in the binding curvature distortion in the image.

26. The system of claim 25, wherein the logic that determines a three dimensional model of the set of pages in the image further comprises logic that determines a height of the binding centerline above the image acquisition surface.

27. The system of claim 26, wherein the logic that determines the height of the binding centerline above the image acquisition surface further comprises logic that measures a brightness gradient in the binding curvature distortion about the binding centerline at a number of predetermined positions along the binding centerline.

28. A system for binding curvature correction, comprising:

a processor circuit having a processor and a memory; and a binding curvature distortion corrector stored in the memory and executable by the processor, the binding curvature distortion corrector comprising logic that corrects a binding curvature distortion in an image of a set of pages of a bound medium by generating a corrected image that includes the content of the image without the binding curvature distortion, wherein the logic that corrects further comprises:

logic that obtains a three dimensional model of the set of pages in the image; and logic that maps each of the pages to the corrected image using the three dimensional model, wherein the corrected image is expressed in two dimensions;

wherein the logic that obtains the three dimensional model of the set of pages in the image further comprises:

logic that obtains a number of input variables representative of characteristics of the image;

at least one neural network trained to calculate a number of coefficients of a surface equation representing the three dimensional model from the number of input variables;

logic that locates a binding centerline in the binding curvature distortion in the image; and logic that determines a height of the binding centerline above the image acquisition surface; and wherein the logic that determines the height of the binding centerline above the image acquisition surface further comprises logic that measures a brightness gradient in the binding curvature distortion about the binding centerline at a number of predetermined positions along the binding centerline.

29. A system for binding curvature correction, comprising:

means for generating an image of a set of pages of a bound medium on an image acquisition surface, the image having a binding curvature distortion;

means for obtaining a three dimensional model of the set of pages in the image;

means for mapping a portion of each of the pages that falls within the binding curvature distortion to a position on an image acquisition surface associated with the image, thereby generating a corrected image without the binding curvature distortion; and wherein the means for obtaining the three dimensional model of the set of pages in the image further comprises:

means for obtaining a number of input variables representative of characteristics of the image; and at least one neural network trained to calculate a number of coefficients of a surface equation representing the three dimensional model from the number of input variables; and wherein the means for obtaining the number of input variables representative of characteristics of the image further comprises means for obtaining a number of values that are representative of a corresponding number of measurements of a brightness gradient in the binding curvature distortion.

30. A multifunction peripheral that provides for binding curvature correction, comprising:
- a scanner with an image acquisition surface, the scanner being adapted to generate an image of a medium placed on the image acquisition surface; and
- a binding curvature distortion corrector comprising:
  - means for obtaining a three dimensional model of the set of pages in the image, wherein the image includes a binding curvature distortion; and
  - means for mapping a portion of each of the pages that falls within the binding curvature distortion to a position on the image acquisition surface associated with the image, thereby generating a corrected image without the binding curvature distortion; and
  - wherein the means for obtaining the three dimensional model of the set of pages in the image further comprises:
    - means for obtaining a number of input variables representative of characteristics of the image; and
    - at least one neural network trained to calculate a number of coefficients of a surface equation representing the three dimensional model from the number of input variables; and
  - wherein the means for obtaining the number of input variables representative of characteristics of the image further comprises means for obtaining a number of values that are representative of a corresponding number or measurements of a brightness gradient in the binding curvature distortion.

31. The system of claim 30, wherein the binding curvature distortion corrector further comprises means for activating the binding curvature distortion corrector.

32. The system of claim 30, wherein the multifunction peripheral further comprises a printer adapted to print at least one of the image and the corrected image.

33. A multifunction peripheral that provides for binding curvature correction, comprising:
- a scanner with an image acquisition surface, the scanner being adapted to generate an image of a medium placed on the image acquisition surface; and
- a binding curvature distortion corrector comprising:
  - means for obtaining a three dimensional model of the set of pages in the image, wherein the image includes a binding curvature distortion, comprising:
    - means for obtaining a number of input variables representative of characteristics of the image comprising means for obtaining a number of values representative of a position of a corresponding number of lines of text on the pages; and
    - at least one neural network trained to calculate a number of coefficients of a surface equation representing the three dimensional model from the number of input variables; and
  - means for mapping a portion of each of the pages that falls within the binding curvature distortion to a position on the image acquisition surface associated with the image, thereby generating a corrected image without the binding curvature distortion.

* * * * *